United States Patent
Syrjarinne et al.

(10) Patent No.: US 6,646,596 B2
(45) Date of Patent: Nov. 11, 2003

(54) METHOD, SYSTEM AND DEVICES FOR POSITIONING A RECEIVER

(75) Inventors: Jari Syrjarinne, Tampere (FI); Seppo Turunen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/012,277

(22) Filed: Nov. 13, 2001

(65) Prior Publication Data

US 2003/0090414 A1 May 15, 2003

(51) Int. Cl.$^7$ .............................. H04B 7/185; G01S 3/02
(52) U.S. Cl. .............................. 342/357.15; 342/357.12; 342/464
(58) Field of Search ...................... 342/357.02, 357.06, 342/357.1, 357.12, 450, 464, 357.15, 463; 455/456, 457

(56) References Cited

U.S. PATENT DOCUMENTS

| | | | | |
|---|---|---|---|---|
| 6,157,341 A | * | 12/2000 | Silvestrin et al. | 342/357.12 |
| 6,275,186 B1 | * | 8/2001 | Kong | 455/456 |
| 6,285,316 B1 | * | 9/2001 | Nir et al. | 342/357.09 |
| 6,304,216 B1 | * | 10/2001 | Gronemeyer | 342/357.06 |
| 6,313,786 B1 | * | 11/2001 | Sheynblat et al. | 342/357.02 |
| 2002/0005802 A1 | * | 1/2002 | Bryant et al. | 342/357.01 |
| 2002/0015439 A1 | * | 2/2002 | Kohli et al. | 701/213 |
| 2002/0024463 A1 | * | 2/2002 | Turetzky et al. | 342/357.06 |

OTHER PUBLICATIONS

"Understanding GPS: Principles and Applications", E.D. Kaplan, Artech House Inc., 1996, relevant pp. 12–13.

* cited by examiner

*Primary Examiner*—Thomas H. Tarcza
*Assistant Examiner*—Fred H Mull
(74) *Attorney, Agent, or Firm*—Perman & Green,LLP

(57) ABSTRACT

The invention relates to a method for positioning a receiver based on code modulated signals transmitted by a plurality of transmitting units, which code modulated signals are formed by an individual code for each transmitting unit. In order to enable an improved positioning it is proposed that the method comprises in a first step receiving signals at said receiver. In a second step a correlation of the received signals is performed with predetermined replica codes corresponding to the individual codes employed by the transmitting units for determining potentially used channels based on resulting correlation peaks. A third step consists in determining a value indicative of the signal level of each channel for which a maximum correlation peak is obtained in a correlation with one of said predetermined codes. In a fourth step a position of said receiver is determined based on signals of channels resulting in the correlations in a maximum correlation peak, of which channels the value indicative of the signal level exceeds a threshold value.

31 Claims, 2 Drawing Sheets

METHOD, SYSTEM AND DEVICES FOR POSITIONING A RECEIVER

FIELD OF THE INVENTION

The invention relates to a method for positioning a receiver based on code modulated signals transmitted by a plurality of transmitting units, which code modulated signals are formed by an individual code for each of said transmitting units. The invention equally relates to such a receiver, to positioning means and a computing server for positioning a receiver, and to a positioning system comprising a receiver and a computing server.

BACKGROUND OF THE INVENTION

A known positioning system which is based on the evaluation of signals transmitted by satellites as transmitting units is GPS (Global Positioning System). The constellation in GPS consists of more than 20 satellites that orbit the earth in 12 hours. The distribution of these satellites ensure that usually between five and eight satellites are visible from any point on the earth.

Each of the satellites, which are also called space vehicles (SV), transmits two microwave carrier signals. One of these carrier signals L1 has a carrier frequency of 1575.42 MHz and is employed for carrying a navigation message and code signals of a standard positioning service (SPS). The L1 carrier phase is modulated by each satellite with a different C/A (Coarse Acquisition) Code, as which a Gold code is used. Thus, different channels are obtained for the transmission by the different satellites. The C/A code is a 1 MHz Pseudo Random Noise (PRN) Code and is spreading the spectrum over a 1 MHz bandwidth. The C/A code is repeated every 1023 bits, the epoch of the code being 1 ms. The carrier frequency of the L1 signal is further modulated with navigation information at a bit rate of 50 bit/s, which information comprises in particular ephemeris data and data on clock corrections. Ephemeris parameters describe short sections of the orbit or the respective satellite. Based on these ephemeris parameters, an algorithm can estimate the position of the satellite for any time while the satellite is in the respective described section.

Receiving means of a receiver of which the position is to be determined, receive the signals transmitted by the currently available satellites. The information in the received signals enables positioning means connected to the receiving means to compute the distance to several satellites. The computed distance between a specific satellite and a receiver is called pseudo-range, because the time is not accurately known in the receiver. The pseudo range can be computed based on the reciprocal pseudo propagation delay of signals from the respective satellite. The computed distances and the estimated positions of the satellites then permit a calculation of the current position of the receiver. The receiver is located at an intersection of the pseudo-ranges from a set of satellites. In order to be able to compute a position of a receiver in three dimensions and the time offset in the receiver clock, the signals from four different GPS satellite signals are required.

Receiving means and positioning means can be comprised in a single, autonomous electronic device constituting a receiver. Alternatively, the positioning means can be external to the receiver. The receiver can for example have access to a cellular network with positioning means. The receiver then only has to transmit the received data to the network, where the positioning calculations are carried out.

The employed modulation technique enables the receiver to distinguish between the signals transmitted by the different satellites and thus to extract the included information, even though the satellites use the same carrier frequency. To this end, the receiver has to synchronize with the respective channel employed by a satellite, i.e. to detect and track the C/A code in the signal.

For detecting and tracking a code of a received signal, GPS receivers usually use a correlation method by which the codes in received signals are compared with replica codes for each satellite available at the receiver. The receiver, or external positioning means, can either generate the respective C/A code sequence for a specific satellite with a code generator, or store the different C/A codes. Before performing the correlation, the received signals are down converted by a multiplication with an intermediate frequency. Then, the down converted signal is multiplied for the correlation with the replica of one of the codes. The receiver slides a replica of the respective code in time and repeats the multiplication. The result of the respective multiplication is integrated or low-pass filtered. As the code in a signal transmitted by a satellite and the receiver code line up completely, a correlation peak is reached at which the resulting value is the greatest. A channel of a received signal resulting in the correlation with a specific replica code in the highest peak is assumed to be the channel employed by the satellite for which this specific replica code is provided. A GPS receiver uses the detected signal power in the correlated signal to align the C/A code in the receiver with the code in the satellite signal.

For illustration, FIG. 1 shows a situation in which the described positioning of a receiver can be employed. A receiver 1 is located at a position at which it is able to receive signals from at least four GPS satellites SV1–SV4, as indicated in the figure by arrows. The receiver 1 comprises receiving means 2 for receiving the signals via an antenna, positioning means 3 to which the received signals are forwarded for performing the correlation procedures and for determining the position of the receiver. Storing means 4 provide the positioning means 3 with the replica codes required for the correlation procedures.

In order to enable a positioning in weak signal conditions, an assistance can be provided for recovering the positioning capability. The simplest form of GPS assistance is to deliver navigation data comprising ephemeris data over a cellular network to the receiver. Usually, missing navigation data is the key element why a positioning cannot be maintained or initiated in weak signal condition for a long period.

Assistance data can also be used to improve the sensitivity of a receiver, i.e. to make it capable to acquire and track satellite signals, which are considerably lower than nominal signals. A sufficient sensitivity is a necessary condition for satellite-based positioning in weak signal environments, e.g. within a building.

A high sensitivity, however, has a disadvantage in case strong and weak satellite signals are received at the same time by a receiver. This might be the case for example in a windowed room, in which the signals of one or two satellites are received directly through the window without a significant attenuation, while the signals of all other satellites penetrate the building and are thus attenuated significantly. A cross-correlation of a received strong signal with a wrong replica code may lead to a higher correlation peak than a correlation of a weak satellite signal with a correct replica code. The performed correlation may therefore lead to the detection of signals which are not originating from the satellite of which a replica code is currently used in the correlation procedure. Such erroneously detected signals can either be signals from other satellite signals or noise. These spurious signals may prevent a successful positioning, since even a single spurious signal employed in position calculations may cause the position calculation to fail and in the worst case to destabilize the positioning means for a while.

The attenuation of a signal resulting from a building penetration can be up to 20–30 dBs. A modern GPS receiver with very good sensitivity is able to acquire and track signal that are attenuated up to 30 dBs from the nominal signal level. At the same time, the correlation properties of the C/A or Gold codes in the satellite signals are very poor. The difference resulting between the correlation of a satellite signal with a wrong replica signal compared to the correlation of the same satellite signal with the correct replica signal is usually 22 to 23 dB. In the worst case, the isolation between two codes is even only 21.6 dB. It is thus for example a problem to differentiate between correct satellite signals, which are received already with an attenuation of e.g. −25 dB compared to the nominal level, and high-level signals for which a cross-correlation with a wrong code results in values which are e.g. only −23 dB lower level than the nominal-level. A sensitive receiver can therefore consider a nominal-level signal of a wrong satellite resulting in a high correlation peak with a replica code for the correct satellite as a signal of the correct satellite. It is not possible to unambiguously identify spurious signals until the position of the receiver has been calculated. The situation becomes even more difficult due to network aiding, since network aiding can provide ephemeris to all satellites in the constellation and therefore exclusion cannot be done based on comparison of received navigation data.

It is known to employ a positioning system in which for example respective 4 satellites are selected from a group of available satellites. Based on the selected satellites, it is then attempted to determine the correct position. In case the position cannot be determined correctly with the selected satellites, other 4 satellites are chosen for a further attempt. This method, however, will require on an average much time until the correct position is found.

Similar problems as with GPS can arise with other systems that are employed for positioning a receiver. Such other systems may also be based on code modulated signals transmitted by a cellular network instead of by satellites. In particular for WCDMA systems, for instance, a method called Idle Period Downlink-Observed Time Difference of Arrival (IPDL-OTDOA) is known for positioning a receiver. As in GPS, also in this method, pseudo random noise codes with poor cross-correlation properties are used. Therefore, in the correlation procedures problems similar as in GPS can arise, in case one or two signals are much stronger compared to the other signals. Such a difference in the strength of signals received by the receiver can result for example from considerable differences in the respective distance to base stations transmitting the code modulated signals.

SUMMARY OF THE INVENTION

It is an object of the invention to improve the positioning of a receiver. It is in particular an object of the invention to enable a differentiation between desired signals and spurious signals in order to improve the positioning of a receiver.

This object is reached according to the invention with a method for positioning a receiver based on code modulated signals transmitted by a plurality of transmitting units, which code modulated signals are formed by an individual code for each transmitting unit. It is proposed that in a first step, signals are received at the receiver. Then, a correlation of the received signals with predetermined replica codes corresponding to the individual codes employed by the transmitting units is performed for determining, based on resulting correlation peaks, channels potentially formed by a code of one of said code modulated signals. In a further step, a value is determined which is indicative of the signal level of each channel for which a maximum correlation peak is obtained in a correlation with one of the predetermined codes. Finally, those channels are selected which result in the correlations in a maximum correlation peak and of which channels the value indicative of the signal level exceeds a threshold value. Only the signals of these selected channels are then used for determining the position of the receiver.

The object is also reached with positioning means comprising means for realizing the proposed method based on code modulated signals received via a receiver. Further, the object is reached with a receiver, a computing server and a positioning system comprising such positioning means.

The invention proceeds from the idea that a first position of a receiver can be determined fast, accurately and without a risk of destabilizing the system, if this position can be calculated based only on the signals of a selected group of channels that can be assumed to be correct channels, The channels are first determined by a correlation procedure based on replica codes and an evaluation of correlation peaks as described above. The selection of the group of channels that is then to be used in determining a first position of the receiver is based according to the invention on a value indicative of the signal level of the channels resulting in the correlation procedure. The signal level is a suitable parameter for selecting channels, since the lower the signal level of a channel, the more likely it is that it results form a spurious signal. Channels that have a signal-level below a suitably selected threshold value are filtered out, since they might be erroneous. Thus, the invention allows to avoid using spurious signals in a first position calculation by rejecting spurious signals candidates.

It is an advantage of the invention that a first, possibly preliminary, position can be determined accurately. At the same time, the risk of destabilizing the processing system and thus prolonging the positioning procedure significantly is eliminated.

Preferred embodiments of the invention become apparent from the subclaims.

In a preferred embodiment of the invention, the threshold value is not fixed, but variable. On the one hand, the signal-levels can vary significantly depending on the antenna used. If an active antenna is attached, the signal-levels can be considerably higher than the nominal signal level, and in that case it might be possible that even erroneous correlation peaks could exceed the threshold. Further, the signal levels can vary depending on the respective environmental conditions. In case even the signal with the highest signal level is attenuated significantly, it might not be possible to select enough channels for determining the first position of the receiver, if a fixed threshold value is selected. Therefore, it is proposed to adapt the threshold to the respective situation. More specifically, it is proposed that the highest signal level of a channel detected by the correlation is determined, and that a constant value is subtracted from this highest signal level in order to obtain the threshold value. It is an advantage of the adaptive threshold value that it enables an adaptation to different environments.

Since for a complete positioning of a receiver in space and time the evaluation of the signals of at least four transmitting units are required, it is proposed that the selected group of channels is only used for determining a first position, in case there are at least four such channels with a signal level above the threshold value. However, a network may provide the altitude of a receiver as assistance data. In this case, the remaining coordinates and the time can be determined with the signals of only three transmitting units.

In a further preferred embodiment of the invention, the value indicative of the signal level is given by a determined carrier-to-noise radio C/No, or signal-to-noise ratio S/N.

A suitable constant value for being subtracted from a highest determined C/No value is for example 20 dB. Since the smallest difference resulting in the correlation with a correct code and the cross-correlation with a wrong code is assumed to be −21.6 dB, a constant value of 20 dB would leave a security margin, thus ensuring that wrong correlation peaks are reliably excluded. Any other value could be used as well as constant value, though.

It is moreover proposed that once a position is determined, this position is validated by any suitable method, for example a receiver autonomous integrity monitoring (RAIM) method. Such a method was proposed e.g. by E. D. Kaplan (ed.) in: "Understanding GPS: Principles and Applications", Artech House Inc., 1996, which is included by reference herewith.

Once a validated first position is found, it is possible to verify also those channels, which were rejected for determining the preliminary position, using the calculated position. Thereby, even the weak signals of a transmitting unit can be included in a second positioning.

The invention can be employed in particular, though not exclusively, in GPS, for example for navigation, positioning, and time dissemination.

Preferably, the invention is implemented in software. In this case, all means of the positioning means proposed according to the invention can be realized with a processor.

The invention can be employed for any kind of system in which a receiver is positioned based on code modulated signals transmitted by several transmission units. Such systems can be in particular satellite based systems like GPS or cellular network based systems like a CDMA system. As CDMA system, a WCDMA system is particularly suited, but also any other CDMA system, like the US CDMA system IS-95, can be employed.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
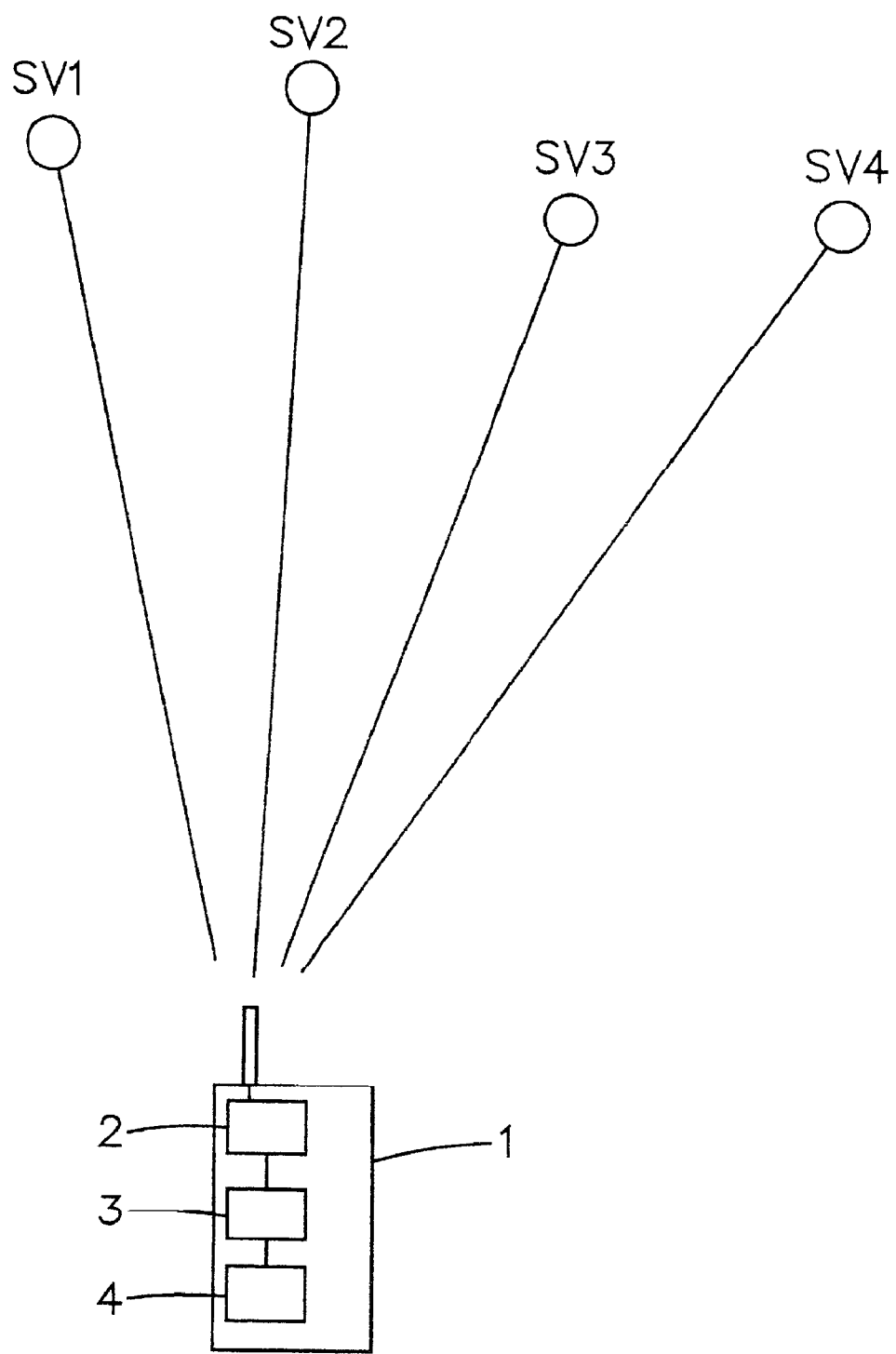
FIG. 1 schematically shows a constellation of an electronic device that is to be positioned and GPS satellites.

For the explanation of an embodiment of the invention, reference will be made again to the elements of FIG. 1, which has already been described above.

Figure 2:
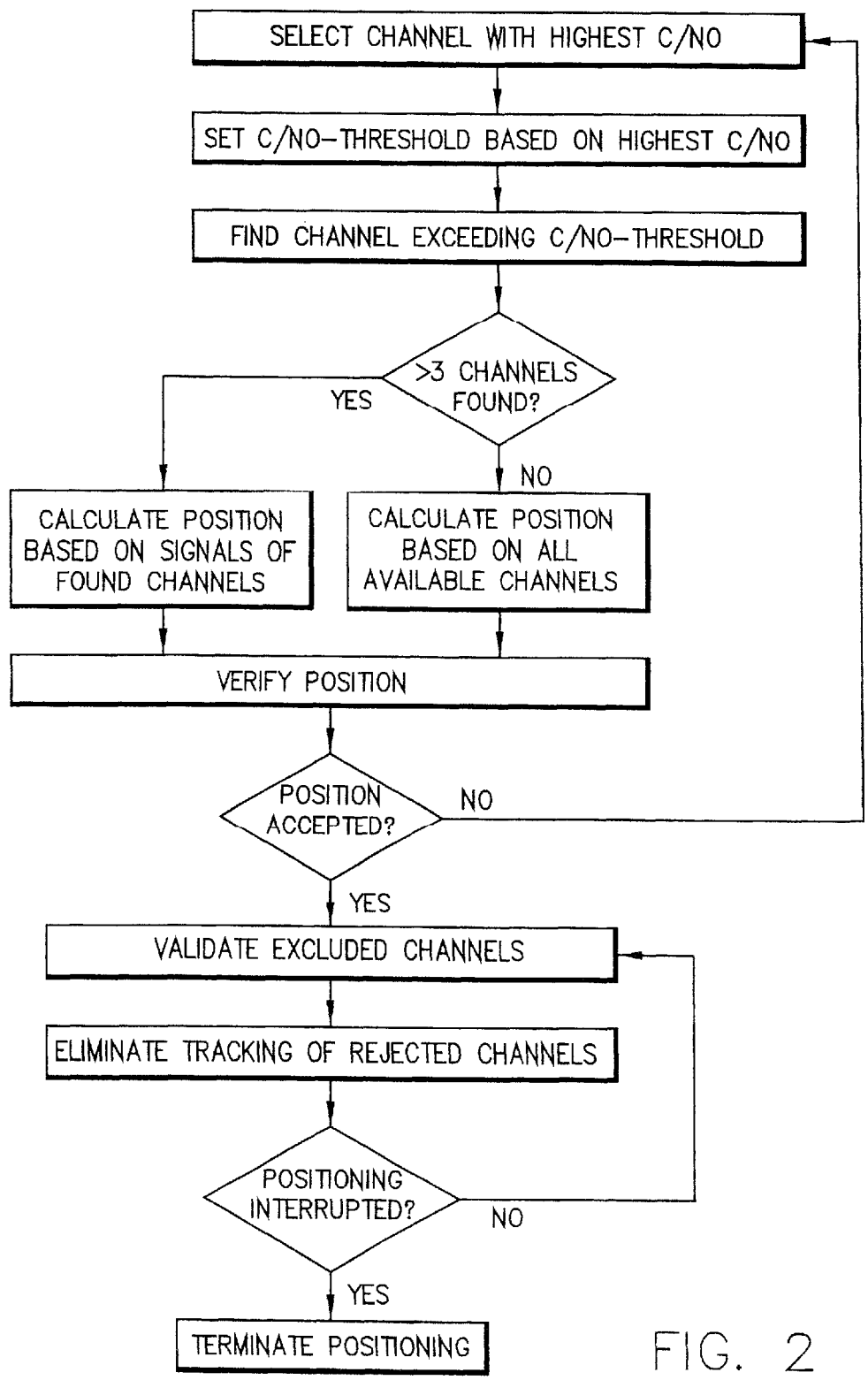
FIG. 2 is a flow chart illustrating an embodiment of the method according to the invention.

FIG. 2 illustrates an embodiment of the method according to the invention which is employed by an electronic device employed as receiver for determining its own position.

The electronic device 1 comprises receiving means 2, positioning means 3 and storing means 4. In the positioning means 3, an algorithm realizing the illustrated method is implemented. At any location, the electronic device 1 is able to receive via its receiving means 2 signals from several GPS satellites SV1–SV4 as described with reference to FIG. 1. A replica of each code employed by the satellites SV1–SV4 for coding the carrier frequency L1 is stored in the storing means 4 of the electronic device 1.

In case the electronic device 1 wishes to determine its current position, it switches to a receiving mode which enables the reception of coded signals transmitted by the GPS satellites SV1–SV4 by its receiving means 2. The receiving means 2 down convert the received signals and provide them to the positioning means 3.

In a first step, the positioning means 3 perform a correlation between the down converted signals and the replica codes provided by the storing means 4. In the respective correlation procedure, several correlation peaks are found, of which the highest one is assumed to result from a desired signal channel employed by one of the satellites SV1–SV4.

Since there is no certitude whether the respective highest peaks indeed result from one of the desired channels, for each of these assumed channels, the C/No level is determined by filtering multiple correlation results. From these C/No levels, the highest level is selected.

Further, a C/No threshold value is determined. To this end, a constant value of 20 dB is subtracted from the selected highest C/No value.

Then, from all assumed channels those channels are selected of which the C/No level exceeds the determined C/No threshold value. For these channels it can be reliably assumed that they constitute a channel formed with the code, of which the correlation with the replica code lead to a maximum correlation peak.

In case channels with a C/No level above the C/No threshold value are received from at least four satellites, information extracted from these channels are used for calculating a preliminary position of the electronic device 1 in a known manner, e.g. as described in the above cited document by Kaplan. If the network provides the altitude of the electronic device 1 as assistance data, however, the remaining position coordinates and the time can be determined with the signals of only three satellites.

Otherwise, a preliminary position is calculated using the signals of all satellites SV1–SV4 from which signals are received, in case there are at least signals from four satellites available. This approach is justified, since it is possible that there are no cross-correlated signals with erroneous correlation peaks present, and that the found channels comprise all correct signals which are partly very weak and partly very strong. Again, if the network provides the altitude of the electronic device 1 as assistance data, only signals from three satellites are required for determining the preliminary position.

In a next step, the positioning means verify, whether the calculated preliminary position is valid using a RAIM method.

If the position is rejected upon this verification, the electronic device 1 waits unit more satellites have been detected and starts the method illustrated in FIG. 2 anew with the first step.

If in contrast the preliminary position is accepted, this position is used to validate the satellites SV1–SV4 that were excluded before in calculating the position, because their channels did not have a sufficiently high C/No level. With the known position, the validation of these satellites SV1–SV4 can now be based for instance on a comparison of a measured pseudo-range with a predicted pseudo-range. The pseudo range can be measured by measuring the reciprocal pseudo propagation delay of signals from the respective satellite SV1–SV4. A prediction of the pseudo range is possible whenever an approximate position of a receiver 1 is already known. Satellites SV1–SV4 which are rejected also in this validation procedure are excluded from further tracking.

This validation of satellites SV1–SV4 after a preliminary position has been accepted is continued until the positioning is ceased or otherwise interrupted.

It is not required that an electronic device comprises the positioning means itself. Alternatively, an electronic device could comprise means for communicating with external positioning means to which it forwards received signals. Such external positioning means could be integrated in particular in a cellular network, with which the electronic device is able to communicate.

Thus, while there have shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for positioning a receiver based on code modulated signals transmitted by a plurality of transmitting units, which code modulated signals are formed by an individual code for each of said transmitting units, said method comprising:
   receiving signals at said receiver;
   performing a correlation of said received signals with predetermined replica codes corresponding to said individual codes employed by said transmitting units for determining, based on resulting correlation peaks, channels potentially formed by a code of one of said code modulated signals;
   determining a value indicative of the signal level of each determined channel for which a maximum correlation peak is obtained in a correlation with one of said predetermined codes;
   determining a position of said receiver based on signals of those channels resulting in said correlations in a maximum correlation peak in a correlation with one of said predetermined codes, of which channels the respective value indicative of the signal level exceeds in addition a threshold value.

2. The method according to claim 1, wherein said threshold value is adaptively determined by subtracting a predetermined value from the highest of said determined values indicative of said signal levels.

3. The method according to claim 1, wherein said channels of which said value indicative of the signal level exceeds said threshold value are used exclusively for determining at least preliminarily a position of said receiver only in case the values indicative of the signal level of at least four channels resulting in said correlations in a maximum correlation peak exceed said threshold value, or in case the altitude of said receiver is provided as assistance information by a network and the values indicative of the signal level of at least three channels resulting in said correlations in a maximum correlation peak exceed said threshold value.

4. The method according to claim 1, wherein in case the values indicative of the signal level of less than four channels resulting in said correlations in a maximum correlation peak exceed said threshold value, a position is determined based on the signals of all channels resulting in said correlations in a maximum correlation peak, if there are at least four such channels resulting in a maximum correlation peak.

5. The method according to claim 1, wherein in case the altitude of said receiver is provided by a network as assistance data and in case the values indicative of the signal level of less than three channels resulting in said correlations in a maximum correlation peak exceed said threshold value, a position is determined based on the signals of all channels resulting in said correlations in a maximum correlation peak, if there are at least three such channels resulting in a maximum correlation peak.

6. The method according to claim 1, wherein said value indicative of the signal level of a channel is the carrier-to-noise ratio (C/No) determined for said channel.

7. The method according to claim 1, further comprising validating said determined position, and in case said determined position is accepted in said validation, reexamining based on said determined position the validity of the channels for which said value indicative of the signal level was determined not to exceed said threshold value, and determining a new position based in addition on the signals of channels accepted in said reexamination.

8. The method according to claim 7, further comprising eliminating a tracking of channels not accepted in said reexamination.

9. The method according to claim 1, further comprising validating said determined position, and in case said determined position is rejected in said validation, waiting for a reception of signals from other transmitting units at said receiver for determining a new position as with said previously received signals.

10. The method according to claim 9, wherein said validation is repeated until the positioning of said receiver is interrupted.

11. The method according to claim 1, wherein said transmitting units are satellites.

12. The method according to claim 11, wherein said satellites are GPS satellites and wherein said receiver is a GPS receiver.

13. The method according to claim 1, wherein said transmitting units are network elements of a cellular network.

14. The method according to claim 13, wherein said cellular network is a CDMA based cellular network.

15. Positioning means for positioning a receiver based on code modulated signals transmitted by a plurality of transmitting units, which code modulated signals are formed by an individual code for each transmitting unit, and which code modulated signals are provided to said positioning means by receiving means of said receiver, wherein said positioning means comprise means for performing a correlation of said provided signals with predetermined replica codes corresponding to said individual codes employed by said transmitting units, and for determining, based on resulting correlation peaks, channels potentially formed by a code of one of said code modulated signals;

means for determining a value indicative of the signal level of each channel for which a maximum correlation peak is obtained in a correlation with one of said predetermined codes; and means for determining a position of said receiver based on signals of those channels resulting in said correlations in a maximum correlation peak in a correlation with one of said predetermined codes, of which channels the respective value indicative of the signal level exceeds in addition a threshold value.

16. The positioning means according to claim 15, further comprising means for determining said threshold value adaptively by subtracting a predetermined value from the highest of said determined values indicative of said signal levels.

17. The positioning means according to claim 15, wherein said positioning means are integrated in a GPS receiver.

18. The positioning means according to claim 15, wherein said positioning means are integrated in a mobile terminal employed as receiver.

19. The positioning means according to claim 15, wherein said positioning means are integrated in a computing server to which at least one receiver has access.

20. Receiver comprising receiving means for receiving code modulated signals transmitted by a plurality of transmitting units, which code modulated signals are formed by an individual code for each transmitting unit, and comprising positioning means with means for performing a correlation of said provided signals with predetermined replica codes corresponding to said individual codes employed by said transmitting units, and for determining, based on resulting correlation peaks, channels potentially formed by a code of one of said code modulated signals;

means for determining a value indicative of the signal level of each channel for which a maximum correlation peak is obtained in a correlation with one of said predetermined codes; and means for determining a position of said receiver based on signals of those channels resulting in said correlations in a maximum correlation peak in a correlation with one of said predetermined codes, of which channels the respective value indicative of the signal level exceeds in addition a threshold value.

21. The receiver according to claim 20, wherein said positioning means further comprise means for determining said threshold value adaptively by subtracting a predetermined value from the highest of said determined values indicative of said signal levels.

22. The receiver according to claim 20, wherein said receiver is a GPS receiver.

23. The receiver according to claim 20, wherein said receiver is a mobile terminal.

24. Computing server for positioning a receiver, comprising at least means for receiving via said receiver code modulated signals transmitted by a plurality of transmitting units, which code modulated signals are formed by an individual code for each transmitting unit, and positioning means with means for performing a correlation of said provided signals with predetermined replica codes corresponding to said individual codes employed by said transmitting units, and for determining, based on resulting correlation peaks, channels potentially formed by a code of one of said code modulated signals;

means for determining a value indicative of the signal level of each channel for which a maximum correlation peak is obtained in a correlation with one of said predetermined codes; and means for determining a position of said receiver based on signals of those channels resulting in said correlations in a maximum correlation peak in a correlation with one of said predetermined codes, of which channels the respective value indicative of the signal level exceeds in addition a threshold value.

25. The computing server according to claim 24, wherein said positioning means further comprise means for determining said threshold value adaptively by subtracting a predetermined value from the highest of said determined values indicative of said signal levels.

26. The computing server according to claim 24, wherein said computing server provides access for at least one GPS receiver.

27. The computing server according to claim 24, wherein said computing server provides access for at least one mobile terminal employed as receiver.

28. Positioning system comprising at least one receiver with receiving means for receiving code modulated signals transmitted by a plurality of transmitting units, which code modulated signals are formed by an individual code for each transmitting unit, and further comprising at least one computing server with positioning means including means for performing a correlation of said provided signals with predetermined replica codes corresponding to said individual codes employed by said transmitting units, and for determining, based on resulting correlation peaks, channels potentially formed by a code of one of said code modulated signals;

means for determining a value indicative of the signal level of each channel for which a maximum correlation peak is obtained in a correlation with one of said predetermined codes; and means for determining a position of said receiver based on signals of those channels resulting in said correlations in a maximum correlation peak in a correlation with one of said predetermined codes, of which channels the respective value indicative of the signal level exceeds in addition a threshold value.

29. The positioning system according to claim 28, wherein said positioning means further comprise means for determining said threshold value adaptively by subtracting a predetermined value from the highest of said determined values indicative of said signal levels.

30. The positioning system according to claim 28, wherein said at least one receiver is a GPS receiver receiving said code modulated signals from GPS satellites.

31. The positioning system according to claim 28, wherein said at least one receiver is a mobile terminal receiving said code modulated signals from a cellular network.

* * * * *